United States Patent [19]

Begley et al.

[11] Patent Number: 4,490,891
[45] Date of Patent: Jan. 1, 1985

[54] LINE CLAMP

[76] Inventors: Maxwell G. Begley, 632, Light St., Dianella, Western Australia 6062; Keith Munslow-Davies, 7, Chaffers St., Morley, Western Australia 6062, both of Australia

[21] Appl. No.: 442,165

[22] Filed: Nov. 16, 1982

[30] Foreign Application Priority Data

Jun. 23, 1982 [AU] Australia ............................ PF4556

[51] Int. Cl.³ ............................................. B65D 63/02
[52] U.S. Cl. ........................................ 24/516; 24/24;
 24/270; 24/498; 285/409
[58] Field of Search .................... 24/270, 271, 274 P,
 24/285, 286, 279, 498, 516, 569, 500, 508, 509,
 515, 517, 494, 503, 504; 248/74 R; 339/263 L,
 263 R; 285/409

[56] References Cited

U.S. PATENT DOCUMENTS

| 656,755 | 8/1900 | Stewart | 188/67 |
|---|---|---|---|
| 920,820 | 5/1909 | Brown | 24/498 |
| 974,637 | 11/1910 | Borup | 24/516 |
| 1,478,950 | 12/1923 | Gilliam | 24/569 |
| 1,660,498 | 2/1928 | Vibber | 339/263 L |
| 2,242,573 | 5/1941 | Edwards | 24/516 |
| 2,463,451 | 3/1949 | Yates | 24/67 R |
| 2,655,821 | 10/1953 | Cook | 24/263 B |
| 2,858,516 | 10/1958 | Lindahl et al. | 339/263 L |
| 2,998,956 | 9/1961 | Etten | 24/515 |
| 3,852,943 | 12/1974 | Healy | 24/498 |

FOREIGN PATENT DOCUMENTS 451945 8/1936 United Kingdom ................... 74 R/

Primary Examiner—Victor N. Sakran
Attorney, Agent, or Firm—Kerkam, Stowell, Kondracki & Clarke

[57] ABSTRACT

The present invention provides a line clamp comprising means for securing a member, and means for clamping the member to a line such as a wire line wherein the means for clamping the member to a line comprises a first clamp body portion comprising a cam mounted for partial rotation and being connected to the means for securing a member, a second clamp body portion comprising a further cam mounted for partial rotation, means being provided for detachably securing the second clamp body portion to the first clamp body portion and said cams being so located that when the first and second clamp body portions are secured together, a line may be clamped between them, said cams comprising working surfaces having profiles with relatively low portions flanked by relatively high portions and said line being normally clamped by the said relatively low portions.

The line clamp of the present invention is particularly envisaged for use underwater especially for sub-sea operation such as when operating oil rigs, but can be used in other applications.

10 Claims, 3 Drawing Figures

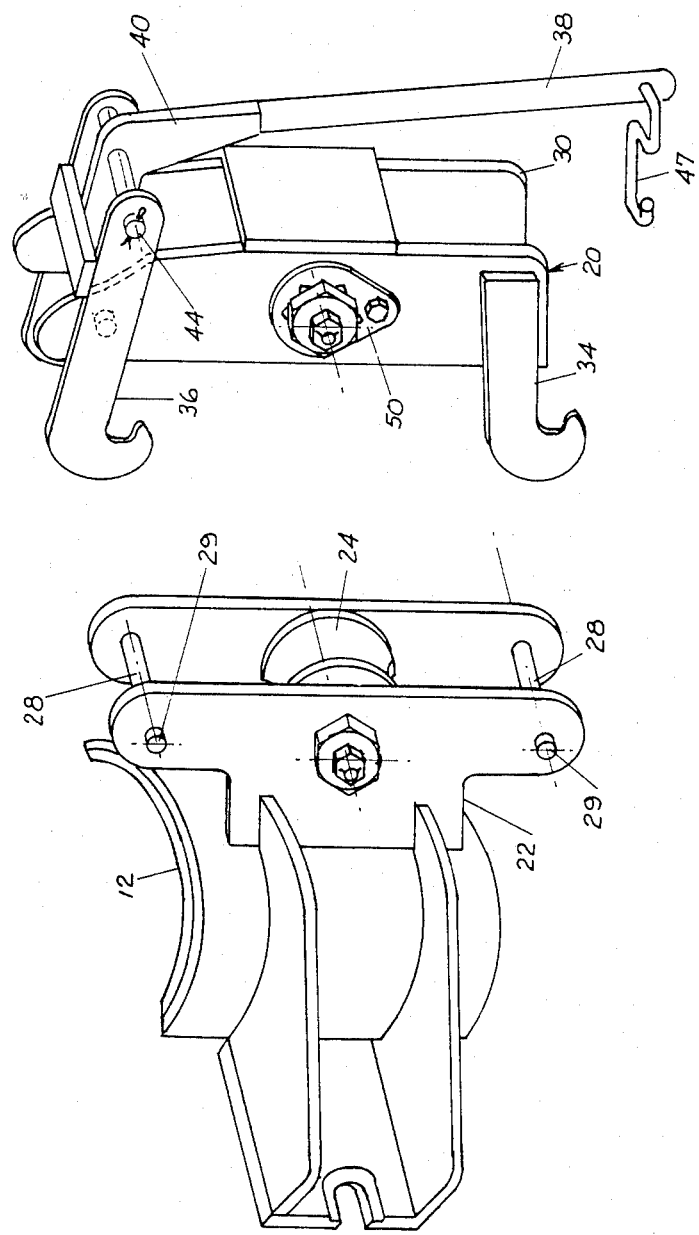

LINE CLAMP

The present invention relates to a line clamp.

In underwater operations such as when operating oil rigs, it is often necessary to secure a member such as a hose line to another member. In some cases the only other member available is a line such as a wire line.

The present invention provides a line clamp which is particularly envisaged for use underwater especially for sub-sea operation but which can be used for mining and industrial applications which are not underwater.

In accordance with the present invention there is provided a line clamp comprising means for securing a member, and means for clamping the member to a line wherein the means for clamping the member to a line comprises a first clamp body portion comprising a cam mounted for partial rotation and being connected to the means for securing a member, a second clamp body portion comprising a further cam mounted for partial rotation, means being provided for detachably securing the second clamp body portion to the first clamp body portion and said cams being so located that when the first and second clamp body portions are secured together, a line may be in clamped condition between them, said cams comprising working surfaces having profiles with relatively low portions flanked by relatively high portions and said line being normally clamped by the said relatively low portions.

The rotary cams may have an eccentric mounting with a relatively low portion and relatively high portions on either side of the relatively low portion. Normally, the relatively low portion of the respective rotary cams clamp the line. However, if the line tends to move slightly relative to the secured member, the cams tend to rotate which means that progressively higher portions of the cam profiles are tending to come into contact with the line. In this way, the clamping force exerted on the line is progressively increased and continues to increase as the force acting on the line increases.

The present invention will now be described, by way of example, with reference to the accompanying drawings, in which:

FIG. 3 is an upper perspective view of part of the clamp of FIG. 1 in disassembled condition.

Figure 1:
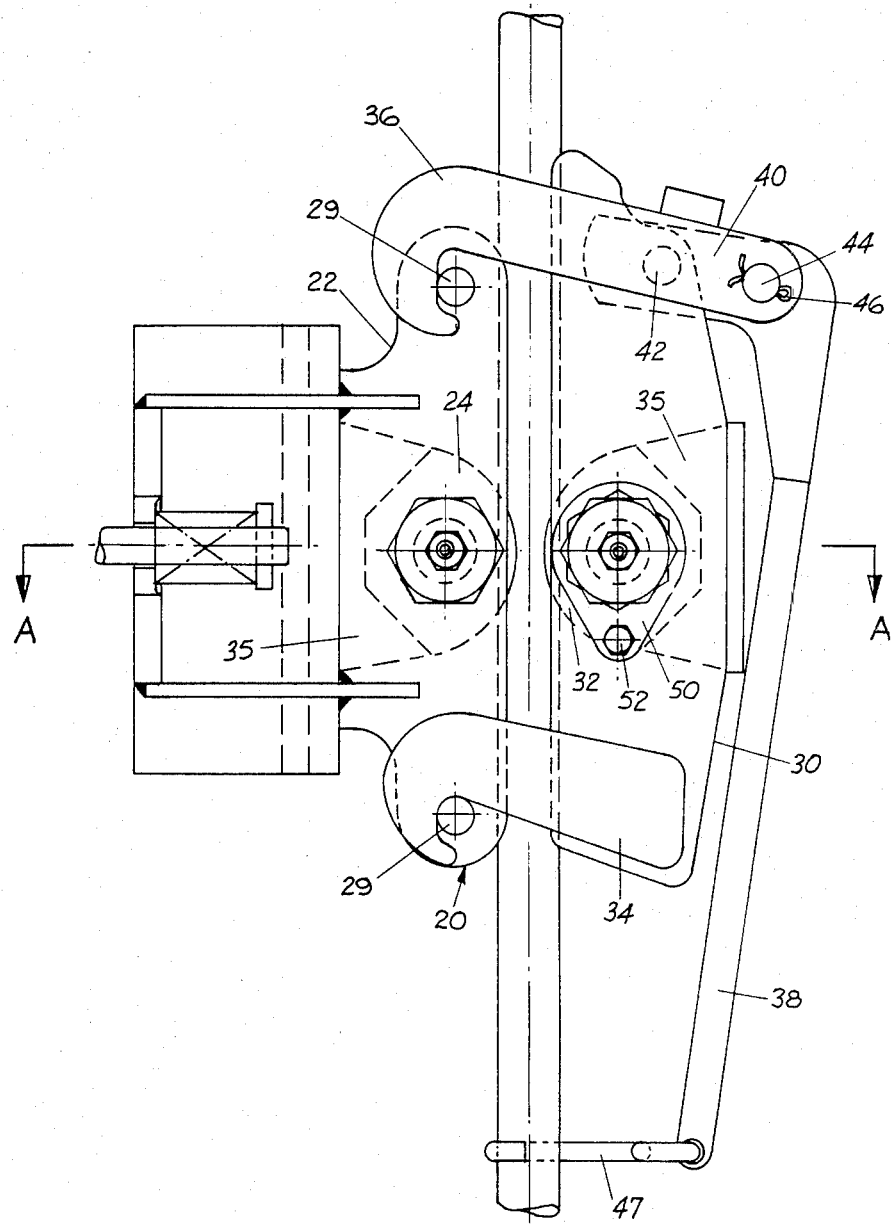
FIG. 1 is a side elevation of a line clamp in accordance with the present invention.

In the drawings, there is shown a line clamp in accordance with the present invention which is particularly designed for sub-sea operations, comprising means for securing a member which member is in the form of a large diameter hose (not shown). The means for securing the hose comprises a pair of jaws 12.

The line clamp of the present invention is particularly envisaged for use with wire lines.

The jaws 12 are pivotally attached to one another on a pin 13 and are arranged to be coupled together by a special clamping mechanism 14. The special clamping mechanism is the subject of co-filed patent application Ser. No. 442,163 entitled "Conduit Clamp (Case 1)" in the name of the present applicants. The line clamp of the present invention is of general applicability and can be used with any means for securing a member.

Figure 2:
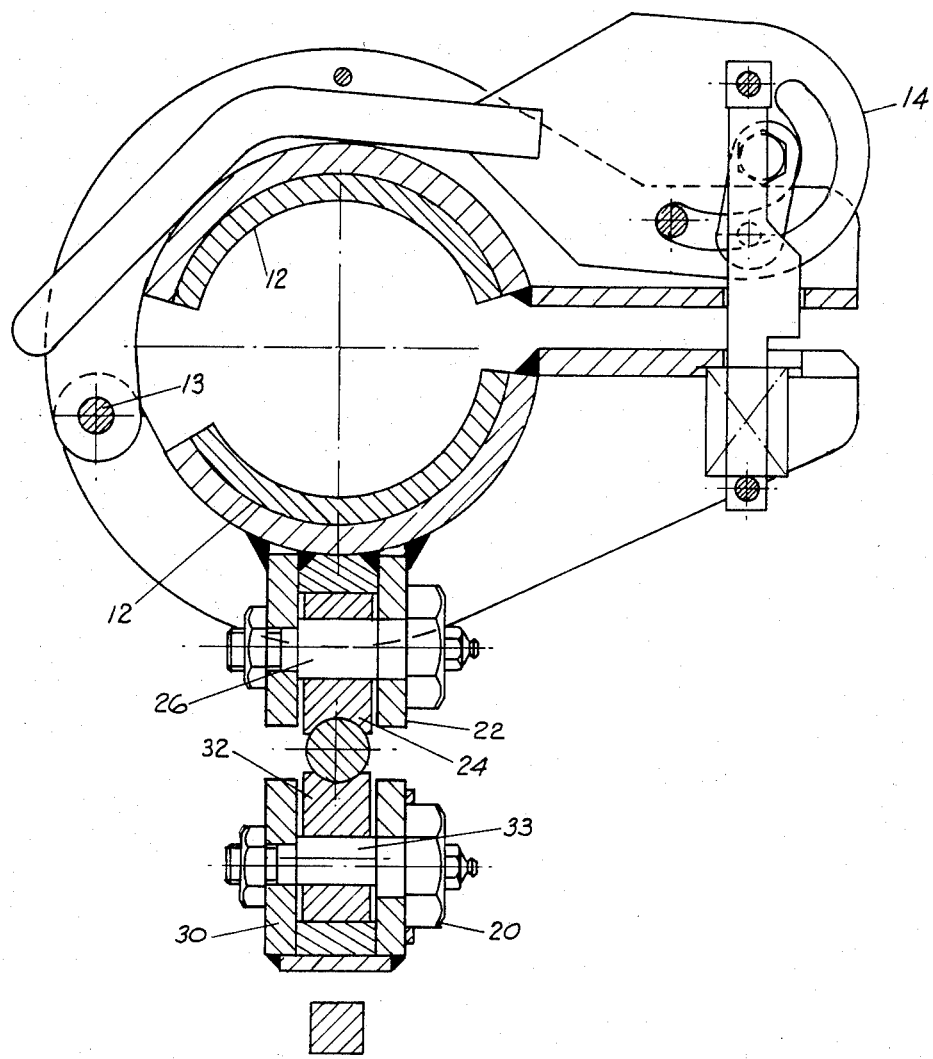
FIG. 2 is a horizontal cross-sectional view through the clamp of FIG. 1 along the line A—A of FIG. 1.

As can be seen in FIG. 2, the jaws 12 are permanently pivotally joined together by a pin 13. This is a slight modification of the clamp of the above mentioned co-filed application which discloses a jaw comprising a hook means and a jaw comprising complementary pin means for detachable engagement with the hook.

One of the jaws 12 has one half of a line clamp 20 in accordance with the present invention welded thereto. The half of the line clamp 20 welded to the jaw 12 comprises a clamp body portion 22 having mounted therein a partially rotatably mounted cam 24. As can best be seen in FIG. 2 the cam 24 is partially rotatably mounted on a stud member 26. The cam 24 is eccentrically mounted on the stud member 26. The cam 24 has a circular working surface comprising a groove having a profile wherein a relatively low portion as shown normally clamps a line and this relatively low portion is flanked by relatively high portions.

Further, above and below the cam 24, the clamp body portion 22 has mounted therein a pair of pins 28. The pins 28 extend across the clamp body portion 22 and extend laterally beyond it in projections 29.

The remaining half of the line clamp 20 may be detachably secured to the first half thereof. The remaining half comprises a clamp body portion 30 having mounted therein a partially rotatably mounted cam 32 also having a circular working profile. The cam 32 is rotatably mounted on a stud 33 which extends through the clamp body portion 30. The cam 32 is eccentrically mounted on the stud 33 such that, as with the cam 24, the working surface of the cam 32 has a profile with a relatively low portion flanked by relatively high portions. Normally the relatively low portions of the cam 32 act to clamp a line.

The cams 24 and 32 are both provided with resilient rubber backing blocks 35 mounted in the respective clamp body portions. The blocks 35, in use, tend to centralise the cams and if they are moved away from their central positions tend to return them to these positions.

Any equivalent resilient means can be used to return the cams to their central positions. For example, the rubber blocks 35 could be replaced by coil spring members having one end anchored to the clamp body portion housing the cam.

The clamp body portion 30 also has attached to it pairs of upper and lower hooks (as seen in FIGS. 1 and 3). A lower pair of hooks 34 are fixedly mounted on either side of the clamp body portion 30 adjacent one end thereof and extend parallel to one another.

An upper pair of hooks 36 are operatively, pivotally connected adjacent the other end of the clamp body portion 30, to opposite sides of an L-shaped handle 38 which comprises an upper short base portion 40.

The hooks 34 and 36 project towards the other clamp body portion 22, in use, for engagement with the projection 29.

The base portion 40 is pivotally mounted in the clamp body portion 30 on a pin 42. The hooks 36 are pivotally mounted to the base portion 40 by means of a pin 44 and are retained thereon by means of split pins 46. The pin 44 is located outwardly of the pin 42 such that when the handle 38 is pivoted upwardly from the position shown in FIG. 1, the handle 38 pivots on the pin 42 and the pin 44 rotates about the pin 42. This pushes the hooks 36 away from the clamp body portion 30 and so releases the hooks 36.

A simple wire hook 47 is attached to the free end of the handle 38.

In use, the clamping mechanism 14 is used to clamp a hose 10 so that the pair of jaws 12 firmly grip the hose 10. The hose 10 needs to be secured to another structure and often the only structure available is a line such as a wire line as shown in the drawings. The clamp body portion 22 is orientated so that it is adjacent a line. Then the clamp body portion 30 is presented to the clamp body portion 22 with the pairs of hooks 34 and 36 foremost. The line is located between the cams 24 and 32.

The hooks 34 are engaged with the lower pin projection 29 with the handle 38 pivoted upwardly so that the hooks 36 are initially out of the way. Then by pivoting the lever 38 downwardly, the hooks 36 are pulled towards the upper projections 29 so as to engage with the upper projections 29. In this condition the line is firmly sandwiched between the working surfaces of the cams 24 and 32 at the relatively low portions of the cams 24 and 32. Further, the hook 47 may be attached to the line to prevent inadvertent movement of the handle 38 while a line is clamped.

If the line tends to move relative to the hose 10 the cams 24 and 32 also tend to rotate on their mountings.

As they rotate or tend to rotate, the cams 24 and 32 exert increasing pressure on the line. The greater is the tendency for the line to move the greater is the tendency for the cams to rotate and thus the applied pressure increases.

It should also be noted in FIG. 2 that the stud 33 is located asymmetrically of its mountings to the clamp body portion 30. This is because using mass production techniques it is extremely difficult to obtain tolerances in the cam profiles which are sufficiently fine for reliable operation. Thus, once the line clamp has been manufactured the tolerances of the cams are measured and then if necessary, fine tuned by rotating the stud 33. This rotation moves the cam 32 either towards or away from the cam 24 until the necessary tolerance has been obtained. Then the stud 33 is prevented from further rotation by means of a locking tab 50 which is secured to the clamp body 30 by means of a threaded bolt 52 engaging with a threaded aperture in the clamp body 30. The locking tab 50 comprises a multi-sided aperture 54 which is mounted about a nut 56 on an end of the stud 33. Once the stud 33 is in the desired position the locking tab 50 is placed over the nut 56 in a position where the bolt 52 can be threadedly engaged with the threaded aperture in the clamp body 30.

Modifications and variations such as would be apparent to a skilled addressee are deemed within the scope of the present invention. For example, as an alternative to the cams 24 and 32 having circular working profiles and eccentric mountings the working profiles could be pre-shaped to have a low portion flanked by relatively high portions. In this case the eccentric mounting of the cams would not be essential.

We claim:

1. A line clamp comprising means for securing a member, and means for clamping the member to a line wherein the means for clamping the member to a line comprises a first clamp body portion comprising a cam mounted for partial rotation and being connected to the means for securing a member, a second clamp body portion comprising a further cam mounted for partial rotation, means being provided for detachably securing the second clamp body portion to the first clamp body portion and said cams being so located that when the first and second clamp body portions are secured together, the cams are opposed to one another and are arranged to clamp a line between them, said cams comprising working surfaces having profiles with relatively low portions flanked by relatively high portions and said line being normally clamped by the said relatively low portions.

2. A line clamp according to claim 1, in which resilient means is provided for retaining each cam in a central position.

3. A line clamp according to claim 2, in which the resilient means are in the form of resilient backing blocks mounted in respective clamp body portions.

4. A line clamp according to claim 1, in which hook means on one body portion is arranged to engage with a complementary member on the other body portion to secure the two body portions together.

5. A line clamp according to claim 4, in which the hook means comprises at least one hook fixedly attached to one body portion adjacent one end thereof and at least one hook pivotally attached to said one body portion adjacent the other end thereof.

6. A line clamp according to claim 4, in which the hook means comprises at least one hook fixedly attached to one body portion adjacent one end thereof and at least one hook pivotally attached to said one body portion adjacent the other end thereof, and in which the pivotally mounted hook means is pivotally connected to the said one body portion by an over the centre linkage such that it can be moved towards and away from a complementary member on the other clamp body portion to detach from or engage with the said complementary member.

7. A line clamp according to claim 4, which comprises a pair of forwardly projecting fixed hooks mounted on either side of said one clamp body portion adjacent one end thereof and a pair of pivotally mounted forwardly projecting hooks mounted on either side of said one clamp body portion adjacent the other end thereof.

8. A line clamp according to claim 1, in which a handle is provided for securing one clamp body portion to the other clamp body portion, said handle being pivotally attached to a means for detachably securing one clamp body portion to the other clamp body portion.

9. A line clamp according to claim 8, in which a hook means is provided on the handle for securing the handle to a clamped line.

10. A line clamp according to claim 1, in which at least one cam has an eccentric mounting so that its location can be finely adjusted relative to the other cam.

* * * * *